United States Patent Office 2,824,809
Patented Feb. 25, 1958

2,824,809

MEAT CURING METHOD AND COMPOSITION THEREFOR

Walter S. Schoch, Chicago, Ill., assignor to Armour and Company, Chicago, Ill., a corporation of Illinois No Drawing. Application June 17, 1954
Serial No. 437,550

11 Claims. (Cl. 99—159)

This invention relates to a meat curing method and to cured meat products. More specifically, this invention relates to the use of phosphate salts in meat curing and to the products obtained.

Phosphate salts such as disodium phosphate have heretofore been incorporated in meat curing compositions, and are generally believed to have some value in stabilizing the red color of the meat product and reducing shrinkage of the product in cooking. However, this use of phosphate salts has not proven to be a complete answer to these problems.

The problem of color instability in cured meat products is particularly acute where slices of the meat product are exposed to fluorescent lights for prolonged periods. This situation is a common one in grocery stores having self-service meat cases. For example, many retail meat departments follow the procedure of slicing and prepackaging canned hams in transparent wrappers for sale in self-service cases. Other cured meat products like bacon, sausage meats, etc. are similarly packaged and displayed. When sliced ham, which has been cured by the usual methods, is displayed under fluorescent lighting, there will be a noticeable fading of the normal bright pink color of the ham in from 3 to 8 hours, and the product may become unsaleable in from 12 to 16 hours.

As indicated above, disodium phosphate appears to have some value in stabilizing the color of cured meats and in increasing cooking yields. Disodium phosphate, however, is not well adapted to plant operations for quick curing hams and other meat products wherein a strong solution of sodium chloride is injected or pumped into the meat product. While disodium phosphate is quite soluble in cold water, it has a limited solubility in cold meat-curing brines. When disodium phosphate is incorporated in brine, therefore, it is necessary to inject the brine at an elevated temperature, which is contrary to the best practice in preventing meat spoilage. The relatively poor solubility of disodium phosphate in pickling brines also causes difficulties with clogged lines and nozzles, making necessary frequent cleaning of the injecting equipment. Further, the brine must be discarded at the end of each day's operations. Still another disadvantage is that the disodium phosphate tends to form crystals in the meat product, especially when it is sliced and exposed to air. Such crystals have the appearance of small flecks of glass and may be mistaken for contaminants by consumers.

It is therefore a general object of this invention to provide a method for curing meat products substantially overcoming the problems discussed above. It is also an object of this invention to produce cured meat products, particularly cured hams, which are highly resistant to fading under fluorescent lighting and which have reduced shrinkage on cooking. Further objects and advantages will become apparent as the specification proceeds.

This invention is based in part on the discovery that a synergistic effect on color stability and yields can be obtained by the combined use in pickling brines of disodium phosphate and a linear sodium phosphate polymer like sodium triphosphate or sodium polymetaphosphate. Surprisingly enough, this discovery also makes possible a solution to the other problems discussed above.

While for the purposes of this invention sodium phosphate salts are preferred, other alkali metal phosphate salts can be used, like the corresponding potassium phosphate salts, providing the salts are edible and non-toxic. As already indicated, disodium phosphate is one of the preferred ingredients for use in practicing the present invention in combination with a linear sodium phosphate polymer. The series of phosphate polymers falling within the scope of the present invention can be represented by the following structural formula:

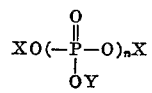

where X is an alkali metal atom or a hydrogen atom, and Y is an alkali metal atom, and $n$ is an integer of 3 or more. When $n$ is an integer greater than 2, that is 3 or more, the compounds are known generally as polymetaphosphates. One common material falling within this latter class is commonly called "hexametaphosphate" although this term is not accurate.

The linear phosphate polymers are commercially available as fused or non-crystalline mixtures, and this form is preferred for the purposes of this invention. Such mixtures are usually designated by empirical formulas corresponding to the average chain lengths, such as "tetraphosphate," etc., but usually contain substantial amounts of both sodium triphosphate and sodium polymetaphosphate. Preferably, the mixture of linear phosphate polymers should be free of cyclic phosphates such as sodium trimetaphosphate and sodium tetrametaphosphate, since these compounds are believed to be toxic in foods, although this has not been conclusively established.

The meat-curing preparation or brine should contain an active concentration of both disodium phosphate and the linear phosphate polymer. The relative proportions of these two types of phosphates is important in achieving the objects of this invention. Preferably, 1 part of disodium phosphate is employed per 2 to 4 parts by weight of the phosphate polymer. This ratio can be varied somewhat while still obtaining some of the advantages of this invention, say from 1 to 5 parts of the phosphate polymer per part of the disodium phosphate.

Common salt (sodium chloride) is the principal active ingredient of pickling brines which are known as salt brines, the salt being dissolved in water to form a concentrated solution. A typical salt brine may be 18% by weight sodium chloride, although the concentration of sodium chloride is varied for different applications. Salt brines also usually contain sodium nitrate. Where the brine is to be used for quick curing, it will also contain a small quantity of sodium nitrite. Sugar is also usually included as an ingredient of the brine. It will be understood, therefore, that this type of preparation is being referred to by the terms "salt brine" or "pickling brine."

Phosphate salts are accepted for use in salt brines up to concentrations of 5% by weight. It has been found that the objects of this invention can be achieved with phosphate salt concentrations of 5% or less, although good results are also obtained with higher concentrations up to 10%. From 3 to 5% phosphate salts in the pickling brine is a satisfactory operating range. The meat product can contain up to 0.5% total added phosphates. Here again, applicant's results can be achieved while observing this limitation. For example, good results are achieved when the meat product contains from .25 to .5% of added phosphate derived from a mixture of disodium phosphate and the linear phosphate polymer, the preferred proportions of these ingredients being as described above.

In the quick curing of ham and other meat products the usual practice is to inject or pump salt brine into the meat product, and thereafter to allow the meat product to stand in a salt brine for a number of days. This invention is particularly concerned with the so-called "pumping pickle," but can also be advantageously employed for the "cover pickle." Pumping pickle is preferably injected at a temperature below 50° F. This temperature has been accepted as the dividing line between "hot pickle" and "cold pickle." The use of cold pickle is preferred since the rate of spoiling of the meat increases rapidly at higher temperatures. Usually the meat is held at about 38 to 45° F. during the injection of the salt brine, and the brine is preferably at a corresponding temperature. With brine prepared in accordance with the present invention, no problems are encountered with the clogging of the injection lines or needles, and the brine can be held for several days. Further, there does not appear to be any recrystallization of the phosphate salts in the meat.

Brine pH's up to 7.2 have been found satisfactory, but excessively alkaline pH's should be avoided. Preferably, the meat after treatment retains a slightly acid pH, that is, a pH below 7.0.

The method of this invention is applicable generally to cured meat products which heretofore have been treated with salt brines, and is particularly advantageous for use in curing hams. As indicated, however, the process can also be used in curing other meat products such as regular bacon, Canadian bacon, sausage meats, etc.

This invention is further illustrated by the following specific examples.

EXAMPLE I

Several series of canned ham were cured and processed using the curing pickles as charted in Table I. These canned hams were opened, sliced and exposed to fluorescent lights in a self-service case in the same manner as followed by retail stores. Yields from the canned weight and chemical analyses were obtained on all hams. The color choice or rank was obtained by grading the exposed packages of sliced ham on the basis of 1 for best, 2 for second choice, etc.

The composite results are given in Table II.

Table II
DATA ON CANNED HAMS (COLOR RATINGS AND YIELD FIGURES)

| Cure | Yield from canned wt., percent | Color choice, 8 hr. exposure | Salt High | Salt Low | Salt Avg. | Nitrite, p. p. m. | Phosphate, Percent |
|---|---|---|---|---|---|---|---|
| A | 87.5 | 5.3 | 3.2 | 2.2 | 2.8 | 35 | 0.71 |
| B | 86.8 | 3.5 | 3.4 | 2.5 | 2.9 | 71 | 0.42 |
| C | 83.3 | 4.5 | 2.9 | 2.2 | 2.8 | 51 | 0.31 |
| D | 89.9 | 4.4 | 3.7 | 1.9 | 2.8 | 74 | 0.53 |
| E | 93.5 | 1.50 | 4.3 | 1.7 | 2.75 | 61 | 0.73 |

EXAMPLE II

One commonly accepted method of curing canning hams is to prepare a 50 to 65° salometer brine containing nitrates and nitrites in amounts varied according to the processor's formulas, but usually within the range of 24 to 32 ounces of sodium nitrate and 8 to 16 ounces of sodium nitrite to 100 gallons of pickle; sugar and/or dextrose is also included in varying amounts or may be omitted.

In the tests reported in Table III the 65° salometer brine was prepared at 40° F., 28 ounces of sodium nitrate and 14 ounces of sodium nitrite were added to 100 gallons of pickle. This constituted the control pickle and base to which phosphates were added to make the pumping pickles and also was used as the covering pickle. The hams were artery pumped 8% by weight and not cured under cover pickle for 4 days, drained 2 days boned, canned and processed.

Preparation of pumping pickles (1) Control: prepared as above.

(2) Di-sodium phosphate: 5% by weight of pickle of di-sodium phosphate was added to the control pickle at 160° F. Constant agitation and a temperature of 110° F. was maintained to and including pumping operation.

(3) Di-sodium phosphate and phosphate polymer: while several proportions of one salt to the other could be used within the total 5% limitation imposed by the M. I. D. the most satisfactory proportion was found to be 1¼% di-sodium phosphate with 3¾% polymer (in this case a proprietary compound Vitrafos). These could be added to the cold pickle if the polymer was dissolved first and then the di-sodium, but very vigorous agitation was required for considerable time. It was found to be more satisfactory to take a 10-15% aliquot of the pickle, heat it to 120° F. and both phosphates could then be quickly and readily dissolved. The concentrated liquid was then returned to the remaining pickle and the whole cooled to use temperature of around 40° F.

(4) Phosphate polymers: 5% by weight of the polymers was added to an aliquot of the pickle heated to 120° F. dissolved and returned to the remaining pickle and cooled to use temperature.

Table I
CANNED HAM CURING FORMULAS AND COVERING FORMULAS

| Cure | Pumping Pickle, 100 gal. Brine Salometer | Pumping Pickle, 100 gal. Sodium Nitrate | Pumping Pickle, 100 gal. Sodium Nitrite | Additives | Covering Pickle, 100 gal.[2] Brine Salometer | Covering Pickle, 100 gal.[2] Sodium Nitrite |
|---|---|---|---|---|---|---|
| | Degrees | Pounds | | | Degrees | Oz. |
| A | 65 | 1.75 | 14 oz. | None | 65 | 5 |
| B | | 1.75 | 1 75#  | do | 65 | 5 |
| C | 65 | | 1.75# | do | 65 | 16 |
| D | 65 | | 1.75# | 2% disodium phosphate [1] | 65 | 16 |
| E | 65 | 1.75 | 14 oz. | 2% disodium phosphate and 6% tetrasodium phosphate.[3] | 65 | 5 |

[1] Required use of hot pickle for pumping.
[2] No additive in cover pickle.
[3] A fused mixture of sodium tripolyphosphate and sodium polymetaphosphate having an average formula $Na_6P_4O_{13}$.

After pumping, curing and canning the hams were held for 2 weeks to set up prior to opening. When opened, the net canned weight, purge or jelly, and net yield of canned ham determined. Table III is a condensed version of the results achieved by using the above pumping pickles.

Table III

| Pumping Pickle | Cover Pickle | 3 Tests, Average Yields in percent | | | Range in Yield, percent | |
|---|---|---|---|---|---|---|
| | | | | | Low | High |
| 1. Control | Control | 87.75 | 87.06 | 88.03 | 86.90 | 90.20 |
| 2. Di-Sodium Phosphate added, 5%/w. | do | 88.33 | 90.05 | 88.96 | 85.60 | 93.21 |
| 3. Di-Sodium + Phosphate Polymers, 1¼%/w., 3¾%/w. | do | 94.33 | 92.96 | 92.47 | 91.62 | 95.40 |
| 4. Phosphate Polymer, 5%/w. | do | 91.6 | 92.10 | 90.06 | 90.01 | 92.20 |

While in the foregoing specification this invention has been described in relation to specific embodiments thereof and many details have been set forth for purpose of illustration, it will be apparent to those skilled in the art that this invention is susceptible to other embodiments and that many of the details set forth can be varied without departing from the basic concepts of the invention.

I claim:

1. The method of curing meat characterized by treating the meat with a salt brine containing active concentrations of dialkali metal phosphate and a linear alkali metal phosphate polymer, said phosphates being employed in relative proportions of 1 part by weight of said dialkali metal phosphate per 1 to 5 parts of said phosphate polymer.

2. The method of curing meat characterized by treating the meat with a concentrated aqueous solution of sodium chloride containing active concentrations of disodium phosphate and a linear sodium phosphate polymer, said phosphates being employed in relative proportions of 1 part by weight of said disodium phosphate per 1 to 5 parts of said phosphate polymer.

3. The method of curing meat characterized by injecting into the meat a salt brine containing from 1 to 5% by weight of phosphate salts, said phosphate salts being essentially a mixture of disodium phosphate and a linear phosphate polymer selected from the group consisting of sodium triphosphate and sodium polymethaphosphate, said phosphate salts being employed in relative proportions of 1 part by weight of disodium phosphate per 1 to 5 parts of said phosphate polymer.

4. The method of claim 3 in which said meat is ham.

5. The method of curing meat characterized by injecting a salt brine into said meat containing from 1 to 5% by weight of phosphate salts, said phosphate salts being essentially a mixture of disodium phosphate and at least one linear phosphate polymer selected from the group consisting of sodium triphosphate and sodium polymetaphosphate, said phosphates being employed in the proportions of 1 part by weight of disodium phosphate per 2 to 4 parts by weight of said phosphate polymer.

6. The method of claim 5 in which said meat is ham.

7. The method of claim 5 in which said phosphate polymer is a fused non-crystalline mixture of sodium triphosphate and sodium polymethaphosphate.

8. In a process for curing meat, the steps of injecting a salt brine into the meat at temperatures below 50° F. but above the freezing temperature of said meat, said brine containing from 1 to 5% by weight of phosphate salts, said phosphate salts comprising essentially a mixture of disodium phosphate and a linear alkali metal phosphate polymer in proportions of 1 part by weight of said disodium phosphate per 1 to 5 parts of said phosphate polymer, and continuing said injection until said meat contains from .25 to .5% of added phosphate salts.

9. The process of claim 8 in which said meat is ham.

10. The process of claim 8 in which said phosphate polymer is a fused non-crystalline mixture of sodium triphosphate and sodium polymetaphosphate.

11. A meat-curing composition, comprising a pickling brine containing sodium chloride as a principal ingredient and characterized by the fact that it contains from 1 to 5% by weight of phosphate salts, said phosphate salts being essentially a mixture of disodium phosphate and a linear phosphate polymer selected from the group consisting of sodium triphosphate and sodium polymetaphosphate, and said phosphate salts being present in relative proportion of 1 part by weight of disodium phosphate per 1 to 5 parts of said phosphate polymer.

References Cited in the file of this patent

UNITED STATES PATENTS

| 2,513,094 | Hall | June 27, 1950 |
| 2,596,067 | Brissey | May 6, 1952 |

FOREIGN PATENTS

| 696,617 | Great Britain | Sept. 2, 1953 |